(12) United States Patent
Vadranapu et al.

(10) Patent No.: US 11,899,673 B2
(45) Date of Patent: Feb. 13, 2024

(54) USER INTERFACE FOR COGNITIVE SEARCH IN CONTENT

(71) Applicant: SONY GROUP CORPORATION, Tokyo (JP)

(72) Inventors: Rajesh Vadranapu, Bangalore (IN); Jaison Joseph, Bangalore (IN); Tsubasa Tsukahara, Bangalore (IN); Miyuki Takazono, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 234 days.

(21) Appl. No.: 17/556,805

(22) Filed: Dec. 20, 2021

(65) Prior Publication Data
US 2023/0195732 A1     Jun. 22, 2023

(51) Int. Cl.
*G06F 16/2457*     (2019.01)
*G06N 20/00*       (2019.01)
*G06F 9/451*       (2018.01)
*G06F 16/248*      (2019.01)

(52) U.S. Cl.
CPC ........ *G06F 16/24575* (2019.01); *G06F 9/451* (2018.02); *G06F 16/248* (2019.01); *G06N 20/00* (2019.01)

(58) Field of Classification Search
CPC .. G06F 16/24575; G06F 9/451; G06F 16/248; G06N 20/00
See application file for complete search history.

(56) References Cited

U.S. PATENT DOCUMENTS

| | | | |
|---|---|---|---|
| 2015/0379048 A1* | 12/2015 | Raghavan | G06F 3/04817 707/706 |
| 2018/0307992 A1 | 10/2018 | Chawla et al. | |
| 2020/0050968 A1 | 2/2020 | Lee et al. | |
| 2020/0159856 A1* | 5/2020 | Mital | G06F 16/953 |
| 2020/0401621 A1* | 12/2020 | Bender | G06F 16/7837 |
| 2023/0004889 A1* | 1/2023 | Epstein | G06F 16/28 |

FOREIGN PATENT DOCUMENTS

CN     109478195 A     3/2019

* cited by examiner

*Primary Examiner* — Apu M Mofiz
*Assistant Examiner* — Husam Turki Samara
(74) *Attorney, Agent, or Firm* — CHIP LAW GROUP

(57) ABSTRACT

An electronic device and method for providing a user interface for a cognitive search in content is provided. The electronic device controls a display device to render an application interface that includes UI elements. The UI elements include a UI element to select media items, a UI element to select input data to be used for search inside content of each media item, and interactive UI elements to configure parameters that control the search inside the content or a metasearch within results of the search. The electronic device receives an input via the UI elements and transmits a search request to a search engine system. The electronic device receives a search result that identifies, from within the content or associated metadata, content elements that match the input data and satisfy the parameters. The display device is controlled to render the search result onto the application interface.

16 Claims, 6 Drawing Sheets

USER INTERFACE FOR COGNITIVE SEARCH IN CONTENT

CROSS-REFERENCE TO RELATED APPLICATIONS/INCORPORATION BY REFERENCE

None.

FIELD

Various embodiments of the disclosure relate to cognitive search, artificial intelligence, and user interfaces for the cognitive search. More specifically, various embodiments of the disclosure relate to an electronic device and method for providing a user interface for a cognitive search in content.

BACKGROUND

Advancements in the field of artificial intelligence (AI) have led to development of sophisticated search tools that use AI to perform searches within a corpus of content. Typically, a search tool provides a user interface (UI) through which a user can input a search query. The search query may be shared with a search engine that may perform the search based on keywords or other parameters associated with the query. For a search within content of several content files, search UIs can include options to configure complex search queries. In many cases, the options presented on conventional search UIs may be limited to a regular expression, keyword-based content filtering options, or options that sort the search results based on few sorting parameters.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for providing a user interface for cognitive search, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
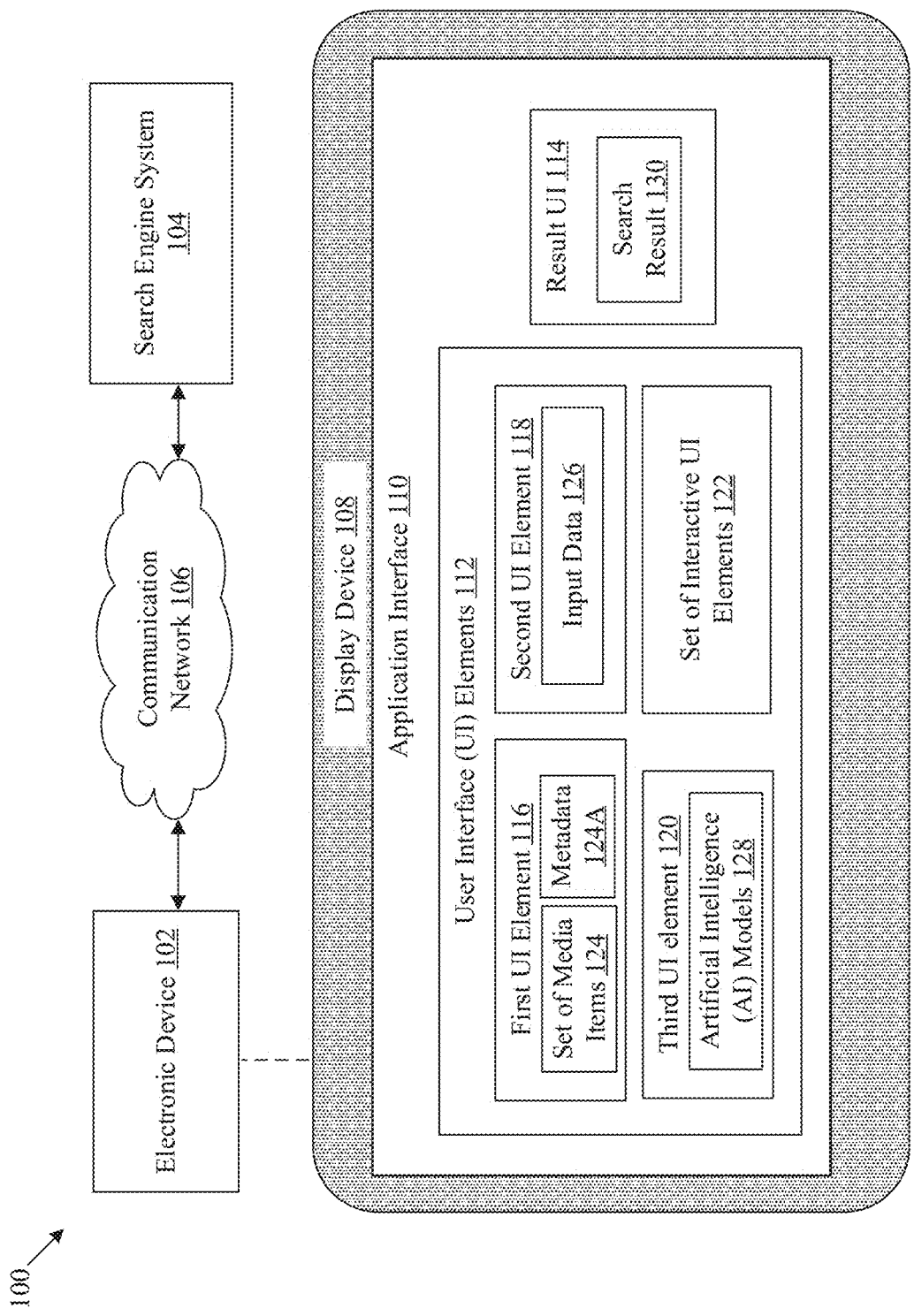
FIG. 1 is a diagram of an exemplary network environment for rendering an application interface for cognitive search in content, in accordance with an embodiment of the disclosure.

The following described implementations may be found in the disclosed system and method for rendering an application interface for cognitive search in content. Exemplary aspects of the disclosure provide an electronic device. For example, the electronic device may be a smartphone or a laptop of a user. The electronic device may be configured to control a display device to render the application interface that may include user Interface (UI) elements. The UI elements may include a first UI element to select a set of media items. The set of media items may include various types of media items, such as videos, audios, images, and/or a combination thereof. For example, the set of media items may include clips of one or more movies or programs. In accordance with an embodiment, the set of media items may include virtually created artefacts if the search is for a created scene (e.g., a game). For example, the search may be performed to look for a particular 3D model or texture in a VR scene.

The UI elements may further include a second UI element to select input data to be used for a search inside content and/or associated metadata of each media item of the set of media items. In some embodiments, the input data may include an image, a text, an audio clip, or a video clip. In some other embodiments, the input data may include other sensor inputs, such as static or dynamic point clouds, 3D video clips, texture maps, bio signals, AR/VR content, medical data (such as MRI images, CT scans, or Ultrasound images), spectrograms, RADAR images, or a combination thereof. For example, the input data to be used for the search inside the content may be an image or an audio clip of an actor who may have acted in one or more movies. The UI elements may further include a set of interactive UI elements to configure parameters that may control at least one of a search inside the content or a metasearch within results of the search. Examples of the parameters may include, but are not limited to, a confidence score applicable on the search, an accuracy of the search result, a similarity score that measures a degree of similarity between the search result and the input data, an affinity score, and a proximity score. The set of interactive UI elements may correspond to, for example, sliders, a checkbox, an equalizer, a checkbox with a slider, a movable dial, and the like. Additionally, or alternatively, the set of interactive UI elements may include a graph with user-configurable nodes representing the parameters and the input data.

In accordance with an embodiment, the set of interactive UI elements may include one or more UI elements to specify a data structure that can be generated from a sensory input, such as tactile, aromatic, haptic, or olfactory input. Such inputs can be used as parameters of the search to be performed in the content or associated metadata of each media item of the set of media items.

The electronic device may further receive a user input via the UI elements of the application interface. The user input may be utilized to fine tune the parameters and the input data. In an exemplary scenario, the parameters and the input data may be fine-tuned by the user. For example, the sliders may be utilized by the user to set the confidence score, the similarity score, and the affinity score. Based on the user input, the electronic device may transmit a search request to a search engine system and may receive a search result corresponding to the search request from the search engine system. The search result may identify, from within the content or associated metadata, one or more content elements that match the input data and satisfy the parameters included in the user input. For example, the search result may include one or more frames (selected from frames) of the selected set of clips of movies that may match the selected input data (such as the image of the actor). The electronic device may control the display device to render the search result onto a result UI of the application interface.

Conventionally, search tools provide a UI through which a user can input a search query. The search query may be shared with a search engine that may perform the search based on keywords or other parameters associated with the query. For a search within content of several content files, search UIs can include options to configure complex search queries. In many cases, the options presented on conventional search UIs may be limited to a regular expression, keyword-based content filtering options, or options that sort the search results based on few sorting parameters. In contrast, the present disclosure provides an improved UI to configure a search query for a search inside content of media items or a metasearch within results of the search. The improved UI may allow a user to fine tune certain parameters associated with the search as well as the input data. Instead of relying on few conventional options, the improved UI offers various cognitive parameters related to the use of AI model(s) in the search. For instance, through the UI, the user may set desired range or value for parameters, such as accuracy, proximity, or similarity. In addition to cognitive parameters, the improved UI may provide UI elements, such as sliders, checkboxes, or a configurable graph to define content-specific parameters which may be related to machine learning task(s) implemented in the search. For example, if the search is to be performed to look for images within video clips that have certain types of face expression, then the improved UI may display options to select various emotion types and set weightages of selected emotion types. The UI elements presented on the improved UI may improve a user's ability to create focused search queries that provide more accurate and focused results. The improved UI may save user's effort in the search, which may otherwise be required on conventional UIs of search tools.

FIG. 1 is a diagram of an exemplary network environment for rendering an application interface to perform a cognitive search in content, in accordance with an embodiment of the disclosure. With reference to FIG. 1, there is shown a block diagram of a network environment 100. The network environment 100 may include an electronic device 102, a search engine system 104, and a communication network 106. The electronic device 102 and the search engine system 104 may be communicatively coupled with each other, via the communication network 106.

The network environment 100 may further include a display device 108 that may be associated with the electronic device 102. The display device 108 may include an application interface 110. The application interface 110 may include user Interface (UI) elements 112 and a result UI 114. The UI elements 112 may include a first UI element 116, a second UI element 118, a third UI element 120, and a set of interactive UI elements 122.

The first UI element 116 may display a set of media items 124, the second UI element 118 may display input data 126 and the third UI element 120 may display artificial intelligence (AI) models 128 to be selected. Further, the result UI 114 may display a search result 130.

The electronic device 102 may include suitable logic, circuitry, and interfaces that may be configured to control the display device 108 to render the application interface 110 that includes the UI elements 112 to configure and perform a search inside content of media items. The electronic device 102 may be further configured to control the display device 108 to render the search result 130 onto the result UI 114 of the application interface 110. Examples of the electronic device 102 may include, but are not limited to, a computing device, a smartphone, a mobile computer, a gaming device, an eXtended Reality (XR) device, a smart television, a digital media player or a streaming box, a mainframe machine, a server, a computer workstation, and/or any consumer electronic (CE) device with a general-purpose processor to process data.

The search engine system 104 may include suitable logic, circuitry, and interfaces that may be configured to receive search requests from the electronic device 102. Based on the search request, the search engine system 104 may be configured to execute a search on a corpus or a set of media items to generate the search result 130. The search result 130 corresponding to the search request may be transmitted to the electronic device 102. Examples of the search engine system 104 may include, but are not limited to, a server or a cluster of servers, a personal computer, a system for federated search, a system for metasearch, or a distributed computing system.

The communication network 106 may include a communication medium through which the electronic device 102 and the search engine system 104 may communicate with each other. The communication network 106 may be one of a wired connection or a wireless connection Examples of the communication network 106 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 106 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The display device 108 may include suitable logic, circuitry, and interfaces that may be configured to display the application interface 110. The display device 108 may be a touch screen which may enable a user to provide the user input via the display device 108. The touch screen may be at least one of a resistive touch screen, a capacitive touch screen, or a thermal touch screen. The display device 108 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 108 may refer to a display screen of a head mounted device (HMD), a smart-glass device, a see-through display, a projection-based display, an electro-chromic display, or a transparent display.

In FIG. 1, the display device 108 is shown to be separate from the electronic device 102, the disclosure may be not so limiting. In some embodiments, the display device 108 may be integrated into the electronic device 102, without departing from scope of the disclosure.

The application interface 110 may correspond to a user interface (UI) rendered on a display screen, such as the display device 108. The application interface 110 may be configured to display the UI elements 112 and the result UI 114. The application interface 110 may be a graphical user interface (GUI), for example. The UI elements 112 may be utilized for interactions between the user and the electronic device 102. For example, the first UI element 116 of the UI elements 112 may be utilized to select the set of media items 124. The second UI element 118 of the UI elements 112 may be utilized to select the input data 126. The third UI element 120 of the UI elements 112 may be utilized to select one or more AI models from an available set of AI models (such as the AI models 128). The set of interactive UI elements 122 may be utilized to configure or fine-tune parameters to control the search inside the content or the metasearch within results of the search.

The result UI 114 may be utilized to view the search result 130. The search result 130 may include one or more content elements that may match the input data 126 and may satisfy the parameters included in the user input. Such elements may be searched from a content of each media item of the set of media items 124. The result UI 114 may further be utilized to select the one or more content elements required by the user.

The set of media items 124 may be any digital media that can be rendered, streamed, broadcasted, and/or stored on any storage or electronic device, such as the electronic device 102. Examples of the set of media items 124 may include, but are not limited to, images, animations (such as 2D/3D animations or motion graphics), audio clips, video clips, conventional television programming (provided via traditional broadcast, cable, satellite, Internet, or other means), pay-per-view programs, on-demand programs (as in video-on-demand (VOD) systems), or Internet content (e.g., streaming media, downloadable media, Webcasts, etc.). In accordance with an embodiment, the set of media items may include virtually created artefacts if the search is for a created scene (e.g., a game). For example, the search may be performed to look for a particular 3D model or texture in a VR scene. In accordance with another embodiment, the set of media items may include static or dynamic point clouds, 3D videos, texture maps, bio signals, AR/VR content, medical data (such as MRI images, CT scans, or Ultrasound images), spectrograms, RADAR images, or a combination thereof.

The input data 126 may include at least one of an image, a text, an audio clip, a video clip, or a combination thereof. The input data 126 may be selected by the user through the application interface 110. In some other embodiments, the input data may include other sensor inputs, such as static or dynamic point clouds, 3D video clips, texture maps, bio signals, AR/VR content, medical data (such as MRI images, CT scans, or Ultrasound images), spectrograms, RADAR images, or a combination thereof.

The AI models 128 may be regression models or classifier models that may be trained to identify relationships between inputs (such as the input data 126 and/or the set of media items 124) and outputs, such as class labels or prediction scores.

In some embodiments, the AI models 128 may be trained on a classification task of emotion recognition. The AI models 128 may be defined by its hyper-parameters, for example, number of weights, cost function, input size, number of layers, and the like. The hyper-parameters of the AI models 128 may be tuned and weights may be updated to move towards a global minimum of a cost function for the AI models 128. In some embodiments, the AI models 128 may be neural network models. After several epochs of training on datapoints of a training dataset, the neural network models (i.e., the trained AI models 128) may be trained to output a classification/regression result for a set of inputs. The classification result may be indicative of a class label for each input of the set of inputs (e.g., input features extracted from new/unseen instances). The regression result may be a prediction score or value of a predicted or target variable. For example, the classification result may indicate one or more recognized emotions associated with a face of a person in the image included in the input data 126.

Each of the AI models 128 may include electronic data, which may be implemented as, for example, a software component of an application executable on the electronic device 102. Each of the AI models 128 may rely on libraries, external scripts, or other logic/instructions for execution by a processing device, such as the electronic device 102. Also, each of the AI models 128 may include code and routines configured to enable a computing device, such as the electronic device 102 to perform one or more operations for classification of one or more inputs (for example for the classification task of emotion recognition). Additionally, or alternatively, the AI models 128 may be implemented using hardware including a processor, a microprocessor (e.g., to perform or control performance of one or more operations), a field-programmable gate array (FPGA), or an application-specific integrated circuit (ASIC). Alternatively, in some embodiments, the AI models 128 may be implemented using a combination of hardware and software.

Examples of each of the AI models 128 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the AI models 128 may implement numerical computation techniques using data flow graphs. In some other embodiments, the AI models 128 may be based on a hybrid architecture of multiple Deep Neural Networks (DNNs) and/or machine learning models. Examples of the machine learning model may include, but are not limited to, a linear regression model, a logistic regression model, a decision tree model, a K-means based model, and a random forest model.

In operation, the electronic device 102 may receive an input from a user to launch a search application. The search application may include an application interface (such as the application interface 110) through which the user may configure a search. The electronic device 102 may control the display device 108 to render the application interface 110. In an embodiment, the display device 108 may be controlled based on the input from the user. The application interface 110 may include the UI elements 112. Details of the application interface 110 and the UI elements 112 are further described, for example, in FIG. 3.

The UI elements 112 may include the first UI element 116 to select the set of media items 124. The set of media items 124 may be video files, audio files, images files, and/or a combination thereof. A text file, such as a subtitle or a closed caption may be included with one or more media items of the set. The set of media items 124 may be stored on the electronic device 102 or may be stored on server(s) associated with content providers. The UI elements 112 may further include the second UI element 118 to select input data 126 to be used for a search inside content or associated metadata 124A of each media item of the set of media items 124. In some embodiments, the input data 126 may include at least one of an image, a text, an audio clip, or a video clip. For example, the input data 126 selected by the user may include an image of a person.

The UI elements 112 may further include the set of interactive UI elements 122 to configure parameters that may control at least one of the search inside the content or a metasearch within results of the search (such as the search result 130). In some embodiments, the set of interactive UI elements 122 may include a slider, a checkbox, an equalizer, a checkbox with a slider, or a movable dial. Details of the set of interactive UI elements 122, are further described, for example, in FIGS. 3 and 5.

In accordance with an embodiment, the parameters may include a confidence score, an accuracy, a similarity score, an affinity score, a proximity score, a first contribution weightage to be associated with each of the confidence score, the accuracy, the similarity score, the affinity score, and the proximity score, a content-specific parameter associated with a machine learning task to be used in the search, and a second weightage to be associated with the content-specific parameter. Details of the parameters are further described, for example, in FIG. 3.

The electronic device 102 may receive a user input via the UI elements 112 of the application interface 110. The user input may include a selection of the set of media items 124 via the first UI element 116, a selection of the input data 126 via the second UI element 118, and a selection of the parameters via the set of interactive UI elements 122. Based on the user input, the electronic device 102 may transmit the search request to the search engine system 104. The search engine system 104 may receive the search request and may execute the search inside the content of each media item of the set of media items 124 to generate an initial search result. The search may be executed by use of one or more AI models of the AI models 128 and may be performed based on the input data 126. The search may be a machine learning task to look-up, within the content or the associated metadata 124A, a set of content elements that may match the input data 126. In accordance with an embodiment, the search engine system 104 may further execute a metasearch to filter the set of content elements in the initial search result. The set of content elements may be filtered based on the parameters in the user input, to determine the one or more content elements of the search result 130. Details of the execution of the metasearch to obtain the search result 130, are further described, for example, in FIG. 3.

The electronic device 102 may receive the search result 130 corresponding to the search request from the search engine system 104. The search result may identify, from within the content or the associated metadata 124A, one or more content elements that may match the input data 126 and may satisfy the parameters included in the user input. The electronic device 102 may control the display device 108 to render the search result 130 onto the result UI 114 of the application interface 110. By way of example, and not limitation, the search result 130 may include a set of frames of the video clips (i.e., media items) related to an emotion expressed by a face in the image (included in the input data 126). Details of the rendering of the search result 130 on the result UI 114, are further described, for example, in FIG. 3.

In accordance with an embodiment, the UI elements 112 may further include the third UI element 120 for selection of an AI model that may be suitable for the machine learning task. The user input, as described in the foregoing description, may include a selection of the AI model from a list of different AI models (the AI models 128). The selection may be based on several factors, such as, but not limited to, a user preference for a machine learning task, a capability of each AI model in the list, a task on which each AI model is trained on, a performance indicator (such as accuracy or confidence) of each AI model. Details of the selection of the AI model of the AI models 128 are further described, for example, in FIG. 4.

In accordance with an embodiment, the set of interactive UI elements 122 may include a first UI element that may be rendered on the display device 108 as a graph with user-configurable nodes representing the parameters and the input data 126. The user-configurable nodes may be connected via a plurality of edges. Each user-configurable nodes may be of an adjustable size which may indicate an importance of the respective node. Each edge of the plurality of edges may be of an adjustable length, which may depict the confidence score between two connecting nodes of the user-configurable nodes. Moreover, a connection of two or more nodes of the user-configurable nodes may indicate a co-occurrence factor to be used in the search. Details of the graph are further described, for example, in FIG. 5.

Figure 2:
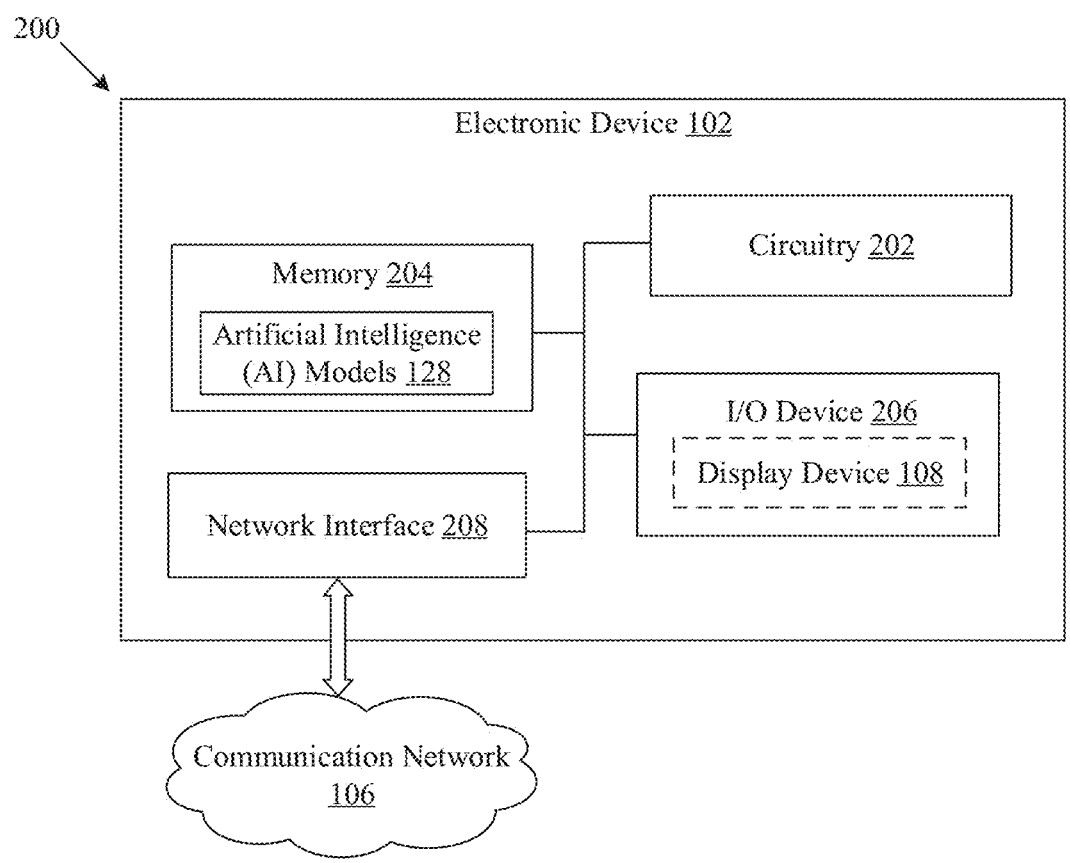
FIG. 2 is a block diagram of a system for rendering the application interface for cognitive search in the content, in accordance with an embodiment of the disclosure.

FIG. 2 is a block diagram of a system for rendering the application interface for cognitive search in the content, in accordance with an embodiment of the disclosure. FIG. 2 is explained in conjunction with elements from FIG. 1. With reference to FIG. 2, there is shown a block diagram 200, which may include the electronic device 102. The electronic device 102 may include circuitry, a memory, an input/output (I/O) device 206 and a network interface 208. The memory may further include the AI models 128. The I/O device 206 may further include the display device 108.

The circuitry 202 may include suitable logic, circuitry, and interfaces that may be configured to execute program instructions associated with different operations to be executed by the electronic device 102. For example, some of the operations may include control of the display device 108 to render the application interface 110, reception of the user input via the UI elements 112 of the application interface 110 and transmission of the search request to the search engine system 104, based on the user input. The operations may further include reception of the search result 130 and control of the display device 108 to render the search result 130 onto the result UI 114 of the application interface 110. The circuitry 202 may be implemented based on several processor technologies known in the art. Examples of the processor technologies may include, but are not limited to, a Central Processing Unit (CPU), an X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 204 may include suitable logic, circuitry, and interfaces that may be configured to store the program instructions to be executed by the circuitry 202. In some embodiments, the memory 204 may be configured to store the AI models 128. The memory 204 may be further configured to store the set of media items 124, the input data 126 and the search result 130. Examples of implementation of the memory 204 may include, but are not limited to, a Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive the user input from the user and provide an output, such as the search result 130 based on the received input. The I/O device 206 which may include various input and output devices, may be configured to communicate with the circuitry 202. In some embodiments, the I/O device 206 may include the display device 108. Examples of the I/O device 206 may include, but are not limited to, a touch screen, a keyboard, a mouse, a joystick, a microphone, a display device, and a speaker.

The network interface 208 may include suitable logic, circuitry, and interfaces that may be configured to facilitate communication between the circuitry 202 and the search engine system 104, via the communication network 106. The network interface 208 may be implemented by use of various known technologies to support wired or wireless communication with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a 5th generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). This network interface 208 may be capable to communicate with a 5G communication network and will include appropriate 5G support functionality such as, but not limited to, a 5G NR, a V2X Infrastructure, and a 5G Smart Antenna.

Figure 3:
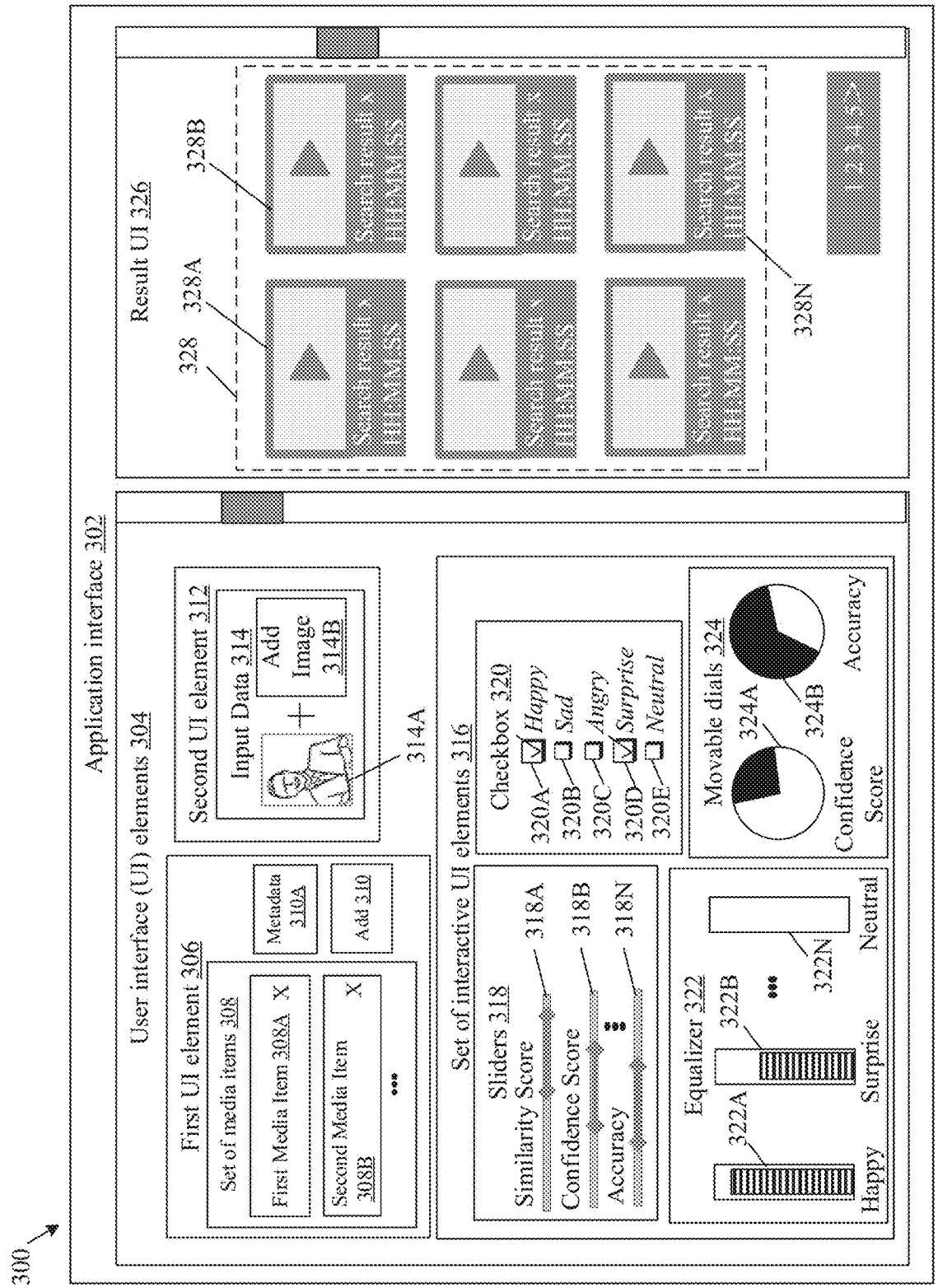
FIG. 3 is a diagram of an exemplary application interface that illustrates user interface (UI) elements and a result UI, in accordance with an embodiment of the disclosure.

FIG. 3 is a diagram of an exemplary application interface that illustrates user interface (UI) elements and a result UI, in accordance with an embodiment of the disclosure. FIG. 3 is described in conjunction with elements from FIGS. 1 and 2. With reference to FIG. 3, there is shown a diagram 300 of an application interface 302. The application interface 302 may include UI elements 304 to configure a search operation. The UI elements 304 may include a first UI element 306 that includes an option to select a set of media items 308. For example, the user may select an add element 310 to upload media items, enter URLs, and/or select media items from an existing repository or corpus of media items.

The UI elements 304 may further include a second UI element 312. The second UI element 312 may include input data 314. The UI elements 304 may further include a set of interactive UI elements 316. The set of interactive UI elements 316 may include a slider 318, a checkbox 320, an equalizer 322, and a movable dial 324. The application interface 302 may further include a result UI 326 which may be configured to display a search result 328. A set of operations to perform a search and to render a search result is described herein.

The circuitry 202 may control the display device 108 to render the application interface 302 that includes the UI elements 304. The first UI element 306 may be utilized by the user to select the set of media items 308 from a repository, a collection, or a corpus of media items. The set of media items 308 may be stored on the electronic device 102 or server(s) associated with a content provider. In an embodiment, the first UI element 306 may populated with URLs/identifiers associated with the selected set of media item 308.

The set of media items 308, including a first media item 308A and a second media item 308B may be images, text documents, audio clips, video clips, or a combination thereof. For example, the first media item 308A and the second media item 308B may be video clips associated with one or more movies of an actor. The first media item 308A and the second media item 308B may be selected using the add element 310. The add element 310 may be selected to upload or specify the selection of the set of media items 308. Similarly, other media items may be selected using the add element 310. The first UI element 306 may include an option to select metadata 310A associated with the set of media items 308 for the search. The metadata 310A may include information about the content of each media item. For example, for a video file, the metadata 310A may be video metadata that includes information, such as but not limited to, an author name, a date of creation, a location where the video is shot, camera information, and an upload date.

In accordance with an embodiment, the set of media items 308 may include virtually created artefacts if the search is for a created scene (e.g., a game). For example, the search may be performed to look for a particular 3D model or texture in a VR scene. In accordance with another embodiment, the set of media items 308 may include static or dynamic point clouds, 3D videos, texture maps, bio signals, AR/VR content, medical data (such as MRI images, CT scans, or Ultrasound images), spectrograms, RADAR images, or a combination thereof.

The second UI element 312 may be utilized by the user to select the input data 314 to be used for a search inside content or the associated metadata (such as the metadata 310A) of each media item, such as the first media item 308A and the second media item 308B of the set of media items 308. In accordance with an embodiment, the input data 314 may include an image, a text, an audio clip, a video clip, or a combination thereof. For example, the input data 314 may include a first image 314A of the first actor in a specific pose, expressing a specific emotion. In accordance with an embodiment, the input data 314 may include other sensor inputs, such as static or dynamic point clouds, 3D video clips, texture maps, bio signals, AR/VR content, medical data (such as MRI images, CT scans, or Ultrasound images), spectrograms, RADAR images, or a combination thereof.

The add image element 314B may be utilized by the user to add other to be in the input data 314. For example, the add image element 314B may be clicked by the user to add other images of the first actor or a second actor different from the first actor. The selected input data 314, such as the first image 314A may need to be used for the search inside the content of each media item of the selected set of media items 308, such as the video clips associated with one or more movies of the first actor. The set of interactive UI elements 316 may be utilized by the user to configure the parameters that may control a search inside the content (such as the set of media items 308) or a metasearch within results of the search.

In accordance with an embodiment, the circuitry 202 may receive an input via the application interface 302. The input may be, for example, a part of the input data 314 and may correspond to a text that includes one or more keywords. In an exemplary scenario, the keywords may include a name of a first actor and a facial expression of the first actor. For example, the input may be a phrase "Tom Hanks laughing in front of a building in a black suit". Based on the or more keywords included in the received input, the circuitry 202 may determine the parameters available for the search or the metasearch.

In accordance with an embodiment, the parameters may include a confidence score applicable on the search or on the AI models 128 to be used in the search. The confidence score(s) may be set by the user and may lie in a range of 0 to 1 or 0% to 100%. The confidence score may depict a confidence level of each of the AI models 128 in generation of a search result (such as the search result 328).

The parameters may further include an accuracy of the search result 328 or of one of the AI models 128 to be used in the search. The accuracy may be set by the user. In accordance with an embodiment, the accuracy may be set based on an initial search result rendered on the result UI 326. The initial search result may be rendered on the result UI 326 based on the input data 314 selected by the user. In an exemplary scenario, the input data 314 may include the image of the first actor with a happy facial expression. The initial search result may include images of the first actor with a sad facial expression. As the initial search result may include the images of the first actor but with a different facial expression as required by the user, the accuracy may be set according to a user preference, such that consecutive search results may include the images of the first actor with the happy facial expression.

The parameters may further include a similarity score that may measure a degree of similarity between the search result 328 and the input data 314. For instance, the similarity score may be set by the user in order to search for images in the media item(s) that may be like the images included in the input data 314. As an example, the input data 314 may include an image of an actor in front of a building. The similarity score may be set by the user to search for images from within the set of media items 308 that depict the actor in front of a building.

The parameters may further include an affinity score and the proximity score. The affinity score and the proximity score may be other parameters that may be set by the user to define a degree of closeness between the input data 314 and the search result 328. Further, the parameters may include a first contribution weightage to be associated with each of the confidence score, the accuracy, the similarity score, the affinity score, and the proximity score. For example, the first contribution weightage may be set by the user by selection of a numeric value, or a numeric range associated with each of the confidence score, the accuracy, the similarity score, the affinity score, and the proximity score.

The parameters may further include a content-specific parameter associated with a machine learning task to be used in the search. For example, the content-specific parameter may be determined based on the input data 314 or the one or more keywords associated with the received input. In an exemplary scenario, the input data 314 may include the image of an actor, such as "Tom Hanks" with a laughing expression and an actress. The content-specific parameter may include the parameters, such as "sad", "happy", "surprise", and so forth. The parameters may include a second weightage to be associated with the content-specific parameter. In case of multiple parameter values (such as sad, happy, and surprise), the second weightage may include a weight assigned to each value of the content-specific parameter. For example, for the image of the actor "Tom Hanks" with a laughing expression, the second weightage assigned to a content-specific parameter value "happy" may be more than the content-specific parameter value "sad".

In accordance with an embodiment, the input data 314 may include a face image or a first audio clip of a person (such as an actor). In such a case, the content-specific parameter may correspond to a weighted combination of multiple emotion types to be used in the search. For example, the first audio clip may include a dialogue between the first actor and an actress. The emotions in the first audio clip may be recognized by the selected AI model (of the AI models 128) to determine the content-specific parameters. The multiple emotions recognized by the AI model may be utilized to generate the parameters. For example, the equalizer 322 may depict multiple emotions and may be utilized by the user to set the second weightage. The second weightage may be set to determine a weighted combination of multiple emotion types to be used in the search.

After the application interface 302 is rendered, the circuitry 202 may receive a user input via the UI elements 304 of the application interface 302. In an exemplary scenario, the first media item 308A and the second media item 308B may be selected by the user for a search. The first image 314A may be selected as the input data 314 that may need to be used for a search inside content of the first media item 308A and the second media item 308B. The sliders 318 may include a first slider 318A to set the similarity score. The sliders 318 may include a second slider 318B to set the confidence score. The sliders 318 may include an Nth slider 318N to set the accuracy. Based on a type of search required by the user, the first slider 318A, the second slider 318B, and the Nth slider 318N may be adjusted by the user. Each of the first slider 318A, the second slider 318B and the Nth slider 318N can be set to have a value within a numeric range, such as 0 to 1 to set a first contribution weightage associated with the similarity score, the confidence score, and the accuracy.

The checkbox 320 may depict the content-specific parameters. The checkbox 320 may include a first checkbox 320A corresponding to an emotion "happy", a second checkbox 320B corresponding to an emotion "sad", and a third checkbox 320C corresponding to an emotion "angry". The checkbox 320 may further include a fourth checkbox 320D corresponding to an emotion "surprise" and fifth checkbox 320E corresponding to an emotion "neutral". In an exemplary scenario, the first checkbox 320A corresponding to the emotion "happy" and the fourth checkbox 320D corresponding to the emotion "surprise" may be selected by the user, based on the first image 314A included in the input data 314. In another exemplary scenario, the first image 314A may depict the first actor with a "sad" facial expression. The user may require searching for the images of the first actor with a different facial expression, such as an "angry" facial expression in the set of media items 308. In such a case, the similarity score may be set low, such as between "0.4 to 0.6" as the required search may include the images of the first actor but with the different facial expression. Further, the third checkbox 320C corresponding to the emotion "angry" may be selected by the user.

For the content-specific parameters depicted in the checkbox 320, the equalizer 322 may be utilized to set the second weightage associated with the content-specific parameters. For example, the equalizer 322 may include a first equalizer 322A corresponding to the emotion "happy". The equalizer 322 may include a second equalizer 322B corresponding to the emotion "surprise". The equalizer 322 may include an Nth equalizer 322N corresponding to the emotion "neutral". Each equalizer of the equalizer 322 may be utilized to set the second weightage. The numeric range of the second weightage may be between 0 to 1. The second weightage may be assigned based on an amount of emotion associated with individual items (e.g., in image frames or in specific audio portions of video clips) of the search result 328.

The movable dials 324 may include a first dial 324A to set the confidence score and a second dial 324B to set the accuracy. Similarly, the movable dials 324 may include other dials corresponding to the similarity score and the proximity score. Each dial of the movable dials 324 may be set to a value within a range, such as a percentage between 0% and 100%. For example, the percentage of the confidence score required by the user may be set by turning the first dial 324A. Similarly, the percentage of the accuracy required by the user may be set by turning the second dial 324B.

The circuitry 202 may be further configured to transmit the search request to the search engine system 104, based on the user input. The circuitry 202 may receive the search result 328 corresponding to the search request from the search engine system 104. The search result may identify, from within the content or associated metadata (such as the metadata 310A), one or more content elements that may match the input data 314 and may satisfy the parameters included in the user input. The circuitry 202 may control the display device 108 to render the search result 328 onto the result UI 326 of the application interface 302.

In some embodiments, the one or more content elements may include one or more images (such as image frames) that may be retrieved from the first media item 308A and the second media item 308B. Such images may match the first image 314A of the input data 314. By way of example, and not limitation, the search result 328 may include a first frame 328A, a second frame 328B, and an Nth frame 328N. In an exemplary scenario, each of the first frame 328A, the second frame 328B, and the Nth frame 328N may include the face of an actor with a specific face expression that matches the face expression of the actor in the first image 314A of the input data 314.

In accordance with an embodiment, the search engine system 104 may execute a search based on the search request. The search engine system 104 may be configured to execute a search inside the content of each media item of the set of media items 308 to generate an initial search result. The search may be executed based on the input data 314 by a selected AI model of the AI models 128. Moreover, the search may be a machine learning task to look-up, within the content, a set of content elements that may match the input data 314. In one or more embodiments, the search engine system 104 may generate the initial search result based on the input data 314, such as the first image 314A. The initial search result may include one or more images related to the first image 314A.

In accordance with an embodiment, the machine learning task may be a classification task of emotion recognition and the selected AI model of the AI models 128 may be trained on the classification task of emotion recognition. For example, the first image 314A of the input data 314 may be an image of the first actor with a smiling facial expression. The AI model may recognize the emotion as "happy" corresponding to the smiling facial expression. The machine learning task may be to look-up, within the content, a set of content elements that may include the images of the first actor with a happy emotion.

In some instances, not all the images in the initial search result may match the first image 314A (or the face expression associated with the first image 314A). In such a case, the initial search result may be determined to be a broad result that may need to be filtered to obtain a more accurate result that satisfies the parameters specified through the user input. In accordance with an embodiment, the search engine system 104 may be further configured to execute a metasearch to filter the set of content elements in the initial search result. The set of content elements may be filtered based on the parameters in the user input, to determine the one or more content elements of the search result 328. If the initial search result is broad in nature, the metasearch may be executed by the search engine system 104 to filter the set of content elements in the initial search result. In some embodiments, the initial search result may be rendered on the result UI 326. The user may analyze the initial search result to configure the parameters. Based on the configured parameters, the circuitry 202 may render the search result 328, such as the first frame 328A, the second frame 328B, and the Nth frame 328N as the one or more content elements of the search result 328.

In accordance with an embodiment, the input data 314 may include the face image of the person, such as an actor. The one or more content items of the search result 328 may include at least one image that may be from within the content and may match the emotion or the face expression of the person in the face image. In an exemplary scenario, the first image 314A may be the face image of the actor. The one or more content items, such as the first frame 328A, the second frame 328B, and the Nth frame 328N may depict the same emotion or the face expression as depicted in the first image 314A of the input data 314.

Figure 4:
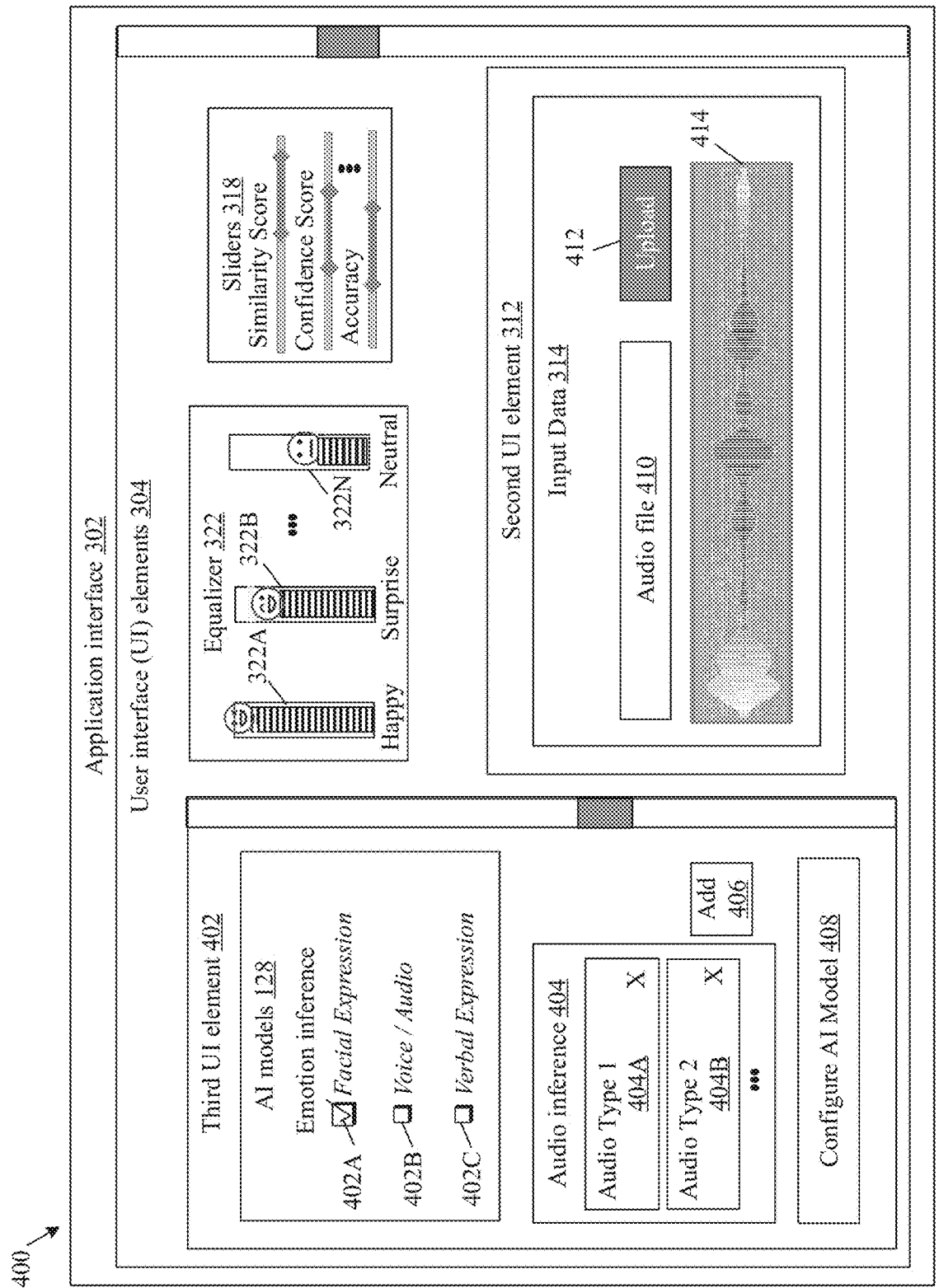
FIG. 4 is a diagram of an exemplary application interface that illustrates selection of an artificial intelligence (AI) model, in accordance with an embodiment of the disclosure.

FIG. 4 is a diagram of an exemplary application interface that illustrates a selection of an artificial intelligence (AI) model, in accordance with an embodiment of the disclosure. FIG. 4 is described in conjunction with elements from FIGS. 1, 2, and 3. With reference to FIG. 4, there is shown a diagram 400. The diagram 400 may include the application interface 302.

The application interface 302 may include the UI elements 304. The UI elements 304 may include a third UI element 402. The third UI element 402 may include a list of the AI models 128. The third UI element 402 may further include an audio inference element 404, an add element 406, and a configure AI model element 408. The UI elements 304 may include the second UI element 312 that may include the input data 314. The input data 314 may include an audio file 410. The audio file 410 and other audio files may be uploaded via an upload element 412. Similarly, the audio file 410 and the other audio files may be merged via an audio equalizer 414. In accordance with an embodiment, an audio input may be received from a microphone (i.e., an audio sensor) instead of the audio file 410. The received audio input may be processed and converted to a file, which may be treated as the input data 314. The search may be performed using the file.

In accordance with an embodiment, the third UI element 402 may be utilized by the user to select an AI model that may be suitable for a machine learning task from the AI models 128. The user input may include a selection of the AI model from a list of different AI models 128 displayed in the third UI element 402. In some embodiments, a first AI model 402A of the AI models 128 may be trained on a task of emotion recognition based on the facial expressions of persons in images. A second AI model 402B of the AI models 128 may be trained on a task of emotion recognition based on an input audio. A third AI model 402C of the AI models 128 may be trained on the task of emotion recognition based on an input text (or verbal expression). Based on the type of data included in the input data 314, the required AI model of the AI models 128 may be selected by the user.

The audio inference element 404 may be utilized by the user to select one or more audio files, such as a first audio file 404A and a second audio file 404B. The selection of the first audio file 404A and the second audio file 404B may be performed via the add element 406. In some instances, the selected first audio file 404A and the second audio file 404B may be utilized to configure the selected AI model of the AI models 128. The configured AI model element 408 may be used by the user to select and configure the AI model of the AI models 128 displayed on the third UI element 402.

In accordance with an embodiment, the input data 314 may include a first audio clip, such as the audio file 410 of the person (such as the first actor). The one or more content items of the search result 328 may include at least one image or a second audio clip that may be from within the content and may match the emotion expressed by the person in the first audio clip (such as the audio file 410). In an exemplary scenario, the first audio clip may include a dialogue between the first actor and a second actor of a movie. The selected AI model of the AI models 128 may classify the emotions expressed by the person in the first audio clip as "surprise" and "happy". Based on the classified emotion(s), the circuitry 202 may receive the search result 328 that may include the one or more images or a second audio clip that matches the emotions "surprise" and "happy". In some embodiments, the input data 314 may include multiple audio files. The audio equalizer 414 may be utilized by the used to merge and create composite audio files to be used for a search in the content.

Figure 5:
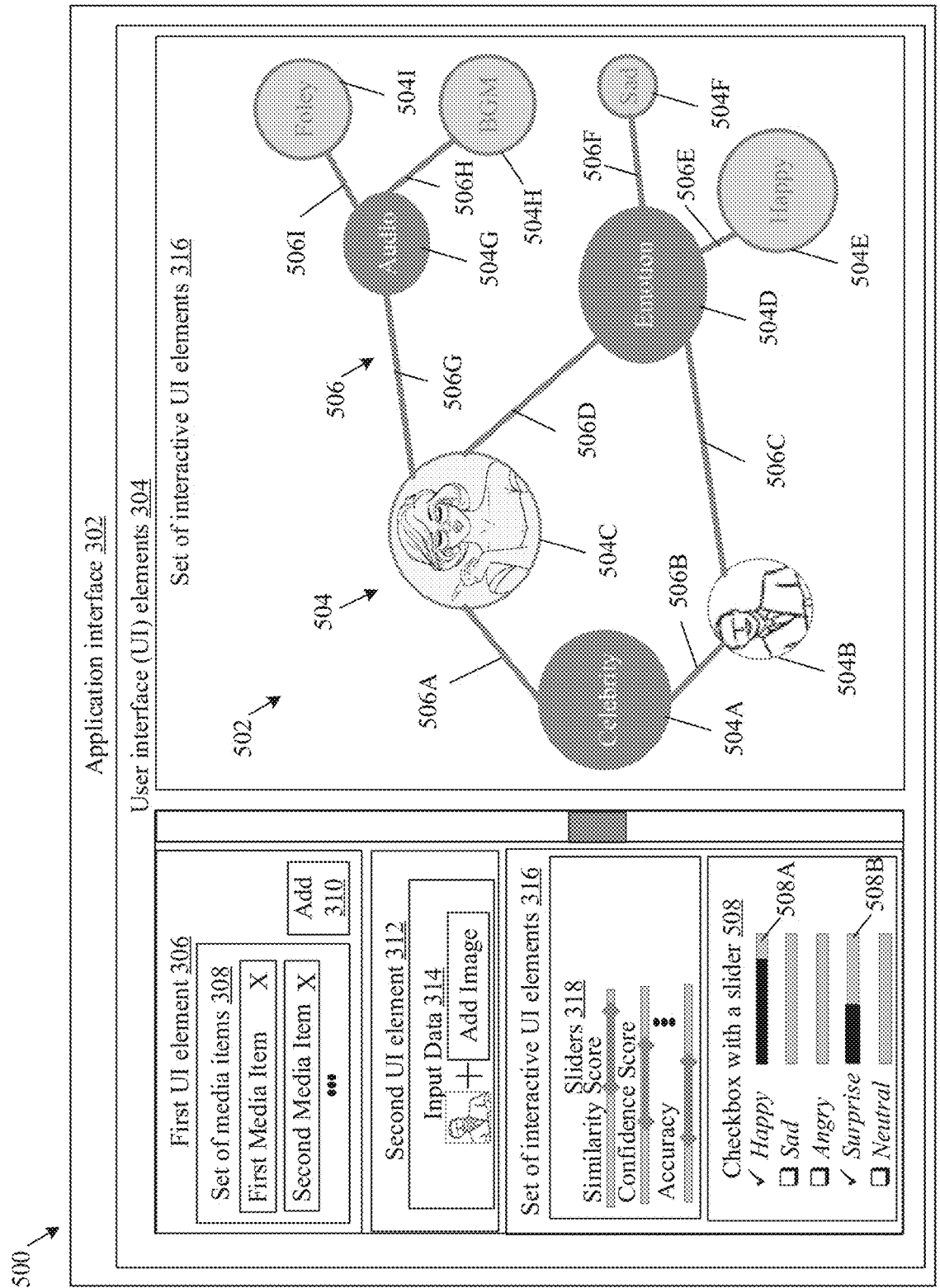
FIG. 5 is a diagram of an exemplary application interface that illustrates a graph with user-configurable nodes, in accordance with an embodiment of the disclosure.

FIG. 5 is a diagram of an exemplary application interface that illustrates a graph with user-configurable nodes, in accordance with an embodiment of the disclosure. FIG. 5 is described in conjunction with elements from FIGS. 1, 2, 3, and 4. With reference to FIG. 5, there is shown a diagram 500. The diagram 500 includes the application interface 302.

The application interface 302 may include the UI elements 304. The UI elements 304 may include a graph 502. The graph 502 may include user-configurable nodes 504 and a plurality of edges 506. The UI elements 304 may further include the set of interactive UI elements 316. The set of interactive UI elements 316 may further include a checkbox with a slider 508. In accordance with an embodiment, the set of interactive UI elements 316 may include a first UI element that may be rendered on the display device 108 as the graph 502 with the user-configurable nodes 504 representing the parameters and the input data 314. The user-configurable nodes 504 may be connected via the plurality of edges 506.

The user-configurable nodes 504 may include a first node 504A corresponding to the parameter "celebrity", a second node 504B corresponding to an image of the first actor (associated with the parameter "celebrity"), and a third node 504C corresponding to an image of a first actress (associated with the same parameter "celebrity"). The user-configurable nodes 504 may further include a fourth node 504D corresponding to a parameter "emotion", a fifth node 504E corresponding to a first value (i.e., "happy") of the parameter "emotion", and a sixth node 504F corresponding to a second value (i.e., "sad") of the parameter "emotion". The user-configurable nodes 504 may further include a seventh node 504G corresponding to the input data 314 (represented by "audio"), an eighth node 504H corresponding to a first audio type "background music" of the input data 314, and a ninth node 504I corresponding to a second audio type "Foley audio" of the input data 314.

As shown, for example, the plurality of edges 506 may include a first edge 506A between the first node 504A and the third node 504C, a second edge 506B between the first node 504A and the second node 504B, a third edge 506C between the second node 504B and the fourth node 504D, and a fourth edge 506D between the third node 504C and the fourth node 504D. The plurality of edges 506 may further include a fifth edge 506E between the fourth node 504D and the fifth node 504E, a sixth edge 506F between the fourth node 504D and the sixth node 504F, a seventh edge 506G between the third node 504C and the seventh node 504G, an eighth edge 506H between the seventh node 504G and the eighth node 504H, and a ninth edge 506I between the seventh node 504G and the ninth node 504I.

Each of user-configurable nodes 504 may be of an adjustable size which may indicate an importance of the respective node. For example, a size of the node (such as the third node 504C) may be more than a size of a node (such as the second node 504B). In such a case, an importance of the third node 504C may be more than an importance of the second node 504B. The size of each node may be adjusted by the user to obtain a desired search result (such as the search result 328). For example, in case the importance of appearance of the celebrity depicted at the third node 504C is more than that of the celebrity depicted at the second node 504B, the size of the third node 504C may be made larger than the size of the second node 504B.

Each edge of the plurality of edges 506 may be of an adjustable length which may depict the confidence score between two connecting nodes of the user-configurable nodes 504. For example, the length between the fourth node 504D corresponding to the parameter "emotion" and the fifth node 504E corresponding to the first emotion "happy" may be less than the length between the fourth node 504D corresponding to the parameter "emotion" and the sixth node 504F corresponding to the second emotion "sad". In such a case, the confidence score of the emotion "happy" may be more than the confidence score of the emotion "sad". Therefore, the search result 328 may include the one or more images that depict the first actor and the first actress as happy.

The connection of two or more nodes of the user-configurable nodes 504 may indicate a co-occurrence factor to be used in the search. For example, the connection between the second node 504B corresponding to the image of the first actor and the third node 504C corresponding to the image of the first actress may indicate the co-occurrence factor to be used in the search. In such a case, the search result 328 may include the one or more images that include both the first actor and the first actress together in one frame.

In some embodiments, the content-specific parameter "emotion" may be selected, and the second weightage associated with the content-specific parameter "emotion" may be provided by the user by use of the checkbox with a slider 508. For example, the second weightage corresponding to the emotion "happy" may be set by the user via a checkbox with a slider 508A and the second weightage corresponding to the emotion "surprise" may be set by the user via a checkbox with a slider 508B.

Figure 6:
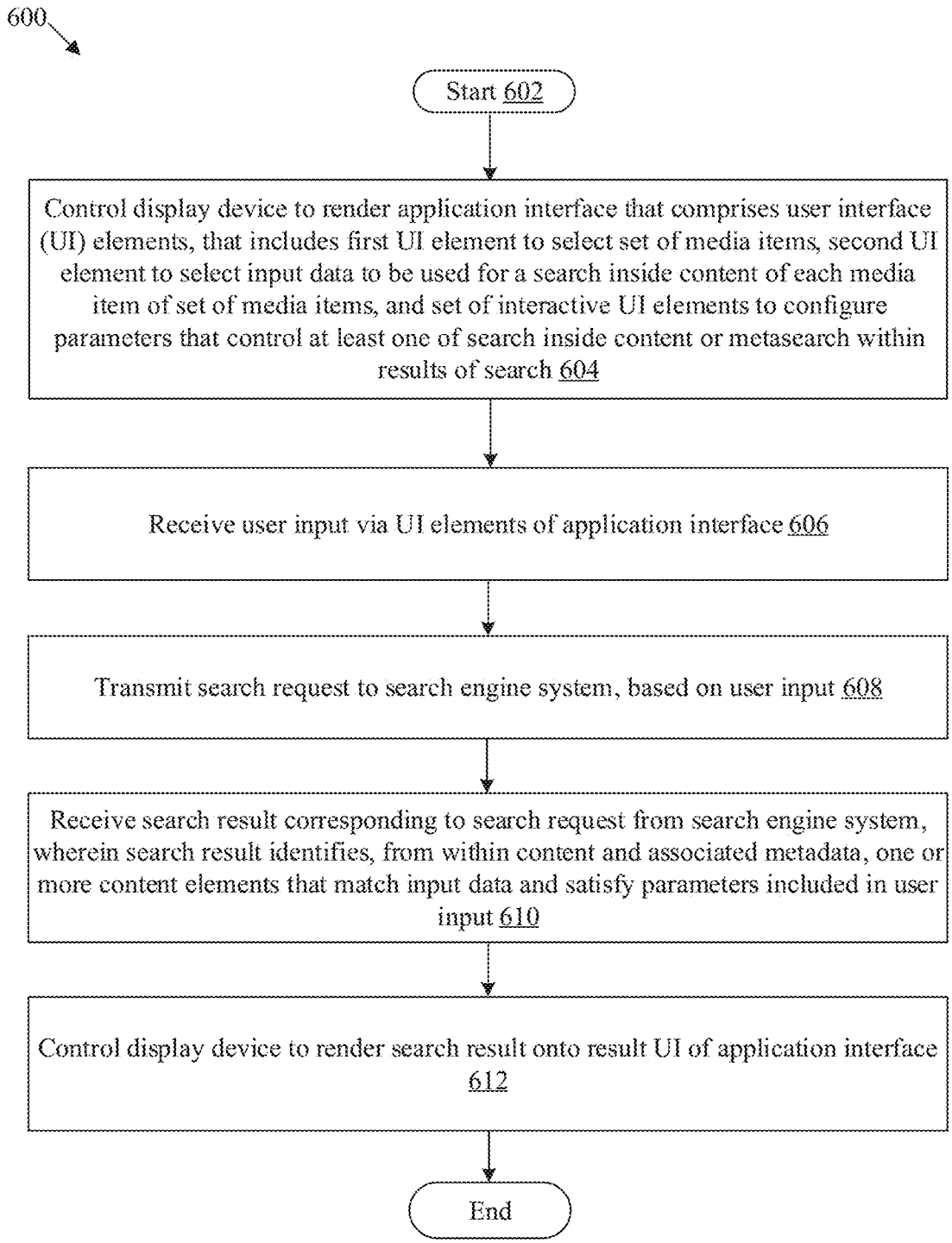
FIG. 6 is a flowchart that illustrates an exemplary method for rendering the application interface for cognitive search in the content, in accordance with an embodiment of the disclosure.

FIG. 6 is a flowchart that illustrates an exemplary method for rendering the application interface for cognitive search in the content, in accordance with an embodiment of the disclosure. FIG. 6 is described in conjunction with elements from FIGS. 1, 2, 3, 4, and 5. With reference to FIG. 6, there is shown a flowchart 600. The exemplary method of the flowchart 600 may be executed by any computing system, for example, by the electronic device 102 of FIG. 1 or the circuitry 202 in FIG. 2. The exemplary method of the flowchart 600 may start at 602 and proceed to 604.

At 604, the display device 108 may be controlled to render the application interface 110 that may include the UI elements 112. The UI elements 112 may include the first UI element 116 to select the set of media items 124, the second UI element 118 to select the input data 126 to be used for a search inside content of each media item of the set of media items 124, and the set of interactive UI elements 122 to configure parameters that may control at least one of the search inside the content or the metasearch within results of the search. In accordance with an embodiment, the circuitry 202 may be configured to control the display device 108 to render the application interface 110. Details of the control of the display device 108 to render the application interface 110, are further described, for example, in FIG. 3.

At 606, the user input may be received via the UI elements 112 of the application interface 110. In accordance with an embodiment, the circuitry 202 may be configured to receive the user input via the UI elements 112 of the application interface 110. Details of the reception of the user input via the UI elements 112 of the application interface 110, are further described, for example, in FIG. 3.

At 608, the search request may be transmitted to the search engine system 104, based on the user input. In accordance with an embodiment, the circuitry 202 may be configured to transmit the search request to the search engine system 104, based on the user input. Details of the transmission of the search request to the search engine system 104, based on the user input, are further described, for example, in FIG. 3.

At 610, the search result corresponding to the search request may be received from the search engine system 104. In accordance with an embodiment, the circuitry 202 may be configured to receive the search result corresponding to the search request from the search engine system 104. The search result 130 identifies, from within the content or associated metadata, one or more content elements that may match the input data 126 and satisfy the parameters included in the user input. Details of the reception of the search result corresponding to the search request from the search engine system 104, are further described, for example, in FIG. 3.

At 612, the display device 108 may be controlled to render the search result 130 onto the result UI 114 of the application interface 110. In accordance with an embodiment, the circuitry 202 may be configured to control the display device 108 to render the search result 130 onto the result UI 114 of the application interface 110. Details of the control of the display device 108 to render the search result 130 onto the result UI 114 of the application interface 110, are further described, for example, in FIG. 3.

Although the flowchart 600 illustrates discrete operations, such as 604, 606, 608, 610, and 612 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-implemented instructions executable by a machine and/or a computer (for example, the electronic device 102). The instructions may cause the machine and/or computer (for example, the electronic device 102) to perform operations for rendering an application interface (such as the application interface 110) for performance of cognitive search in content. The operations may include control of a display device (such as the display device 108) to render the application interface 110 that may include user Interface (UI) elements (such as the UI elements 112). The UI elements 112 may include a first UI element (such as the first UI element 116) to select a set of media items (such as the set of media items 124). The UI elements 112 may further include a second UI element (such as the second UI element 118) to select input data (such as the input data 126) to be used for a search inside content of each media item of the set of media items 124. The UI elements 112 may further include a set of interactive UI elements (such as the set of interactive UI elements 122) to configure parameters that control at least one of the search inside the content or a metasearch within results of the search. The operations may further include reception of a user input via the UI elements 112 of the application interface 110. The operations may further include transmission of a search request to a search engine system (such as the search engine system 104), based on the user input. The search result identifies, from within the content or associated metadata, one or more content elements that match the input data 126 and satisfy the parameters included in the user input. The operations may further include control of the display device 108 to render the search result 130 onto a result UI (such as the result UI 114) of the application interface 110.

Exemplary aspects of the disclosure may include an electronic device (such as the electronic device 102). The electronic device 102 may include circuitry (such as the circuitry 202). The circuitry 202 may be configured to control a display device (such as the display device 108) to render the application interface 110 that may include user Interface (UI) elements (such as the UI elements 112). The UI elements 112 may include a first UI element (such as the first UI element 116) to select a set of media items (such as the set of media items 124). The UI elements 112 may further include a second UI element (such as the second UI element 118) to select input data (such as the input data 126) to be used for a search inside content of each media item of the set of media items 124. The UI elements 112 may further include a set of interactive UI elements (such as the set of interactive UI elements 122) to configure parameters that control at least one of the search inside the content or a metasearch within results of the search. The circuitry 202 may be further configured to receive a user input via the UI elements 112 of the application interface 110. The circuitry 202 may be further configured to transmit a search request to a search engine system (such as the search engine system 104), based on the user input. The search result identifies, from within the content or the associated metadata 124A, one or more content elements that match the input data 126 and satisfy the parameters included in the user input. The circuitry 202 may be further configured to control the display device 108 to render the search result 130 onto a result UI (such as the result UI 114) of the application interface 110.

In accordance with an embodiment, the input data 126 may include at least one of the image, the text, the audio clip, or the video clip.

In accordance with an embodiment, the circuitry 202 may be further configured to receive the input via the application interface 110. The circuitry 202 may determine the parameters available for the search or the metasearch, based on one or more keywords included in the received input.

In accordance with an embodiment, the search engine system 104 may be further configured to execute, by the AI model of the AI models 128, the search inside the content of each media item of the set of media items 124 to generate the initial search result. The search may be executed based on the input data 126 and may be the machine learning task to look-up, within the content, a set of content elements that match the input data 126.

In accordance with an embodiment, the search engine system 104 may be further configured to execute the metasearch to filter the set of content elements in the initial search result. The set of content elements may be filtered based on the parameters in the user input, to determine the one or more content elements of the search result 130.

In accordance with an embodiment, the UI elements 112 may further include the third UI element 120 for selection of the AI model of the AI models 128 that may be suitable for the machine learning task. The user input may include the selection of the AI model from the list of different AI models 128 in the third UI element 120.

In accordance with an embodiment, the machine learning task may be the classification task of emotion recognition and the AI model of the AI models 128 may be trained on the classification task of emotion recognition.

In accordance with an embodiment, the input data 126 may include the face image of the person. The one or more content items of the search result 130 may include at least one image that is from within the content and matches the emotion or the face expression of the person in the face image.

In accordance with an embodiment, the input data 126 may include the first audio clip of the person. The one or more content items of the search result 130 may include at least one image or the second audio clip that may be from within the content and matches the emotion expressed by the person in the first audio clip.

In accordance with an embodiment, the parameters may include at least one of the confidence score applicable on the search or on the AI model of the AI models 128 to be used in the search, the accuracy of the search result 130 or of the AI model to be used in the search, the similarity score that measures the degree of similarity between the search result 130 and the input data 126, the affinity score and the proximity score. The parameters may further include at least one of the first contribution weightage to be associated with each of the confidence score, the accuracy, the similarity score, the affinity score, and the proximity score, and the content-specific parameter associated with the machine learning task to be used in the search, and the second weightage to be associated with the content-specific parameter.

In accordance with an embodiment, the input data 126 may include the face image or the first audio clip of the person, and the content-specific parameter corresponds to the weighted combination of multiple emotion types to be used in the search.

In accordance with an embodiment, the set of interactive UI elements 122 may correspond to at least one of the sliders, the checkbox, the equalizer, the checkbox with the slider, or the movable dials.

In accordance with an embodiment, the set of interactive UI elements 122 may include the first UI element that may be rendered on the display device 108 as the graph 502 with the user-configurable nodes 504 representing the parameters and the input data 126.

In accordance with an embodiment, the user-configurable nodes 504 may be connected via the plurality of edges 506. Each of the user-configurable nodes 504 may be of the adjustable size which may indicate the importance of the respective node. Each edge of the plurality of edges 506 may be of the adjustable length which depicts the confidence score between two connecting nodes of the user-configurable nodes 504. The connection of two or more nodes of the user-configurable nodes 504 may indicate the co-occurrence factor to be used in the search.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
    circuitry including a processor and a memory configured to:

control a display device to render an application interface that comprises User Interface (UI) elements, wherein the UI elements comprise:
  a first UI element to select a set of media items;
  a second UI element to select input data to be used for a search inside content of each media item of the set of media items;
  a third UI element for selection of an Artificial Intelligence (AI) model that is suitable for a machine learning task; and
  a set of interactive UI elements to configure parameters that control at least one of the search inside the content or a metasearch within results of the search, wherein
    the set of interactive UI elements comprises a fourth UI element that is rendered on the display device as a graph with user-configurable nodes representing the parameters and the input data,
    the user-configurable nodes are connected via a plurality of edges,
    each of user-configurable nodes is of an adjustable size which indicates an importance of the respective node,
    each edge of the plurality of edges is of an adjustable length which depicts a confidence score between two connecting nodes of the user-configurable nodes, and
    a connection of at least two nodes of the user-configurable nodes indicates a co-occurrence factor to be used in the search;
  receive a user input via the UI elements of the application interface, wherein the user input includes a selection of the AI model from a list of different AI models in the third UI element;
  transmit a search request to a search engine system, based on the user input;
  receive a search result corresponding to the search request from the search engine system,
    wherein the search result identifies, from within the content or associated metadata, at least one content element that match the input data and satisfy the parameters included in the user input; and
  control the display device to render the search result onto a result UI of the application interface.

2. The electronic device according to claim 1, wherein the input data includes at least one of an image, a text, an audio clip, or a video clip.

3. The electronic device according to claim 1, wherein the circuitry is further configured to:
  receive an input via the application interface; and
  determine the parameters available for the search or the metasearch, based on at least one keyword included in the received input.

4. The electronic device according to claim 1, wherein the search engine system is further configured to:
  execute, by the AI model, the search inside the content of each media item of the set of media items to generate an initial search result,
    wherein the search is executed based on the input data and is the machine learning task to look-up, within the content and the associated metadata, a set of content elements that match the input data.

5. The electronic device according to claim 4, wherein the search engine system is further configured to:
  execute a metasearch to filter the set of content elements in the initial search result,
    wherein the set of content elements is filtered based on the parameters in the user input, to determine the at least one content element of the search result.

6. The electronic device according to claim 5, wherein the machine learning task is a classification task of emotion recognition and the AI model is trained on the classification task of emotion recognition.

7. The electronic device according to claim 6, wherein the input data include a face image of a person, and
  the at least one content element of the search result include at least one image that is from within the content and matches an emotion or a face expression of the person in the face image.

8. The electronic device according to claim 6, wherein the input data includes a first audio clip of a person, and
  the at least one content element of the search result include at least one image or a second audio clip that is from within the content and matches an emotion expressed by the person in the first audio clip.

9. The electronic device according to claim 1, wherein the parameters comprise at least one of:
  a confidence score applicable on the search or on the AI model to be used in the search,
  an accuracy of the search result or of the AI model to be used in the search,
  a similarity score that measures a degree of similarity between the search result and the input data,
  an affinity score,
  a proximity score,
  a first contribution weightage to be associated with each of the confidence score, the accuracy, the similarity score, the affinity score, and the proximity score,
  a content-specific parameter associated with the machine learning task to be used in the search, and
  a second weightage to be associated with the content-specific parameter.

10. The electronic device according to claim 9, wherein the input data includes a face image or a first audio clip of a person, and
  the content-specific parameter corresponds to a weighted combination of multiple emotion types to be used in the search.

11. The electronic device according to claim 1, wherein the set of interactive UI elements correspond to at least one of a slider, a checkbox, an equalizer, a checkbox with a slider, or a movable dial.

12. A method, comprising:
  controlling a display device to render an application interface that comprises User Interface (UI) elements, wherein the UI elements comprise:
    a first UI element to select a set of media items,
    a second UI element to select input data to be used to search inside content of each media item of the set of media items;
    a third UI element for selection of an Artificial Intelligence (AI) model that is suitable for a machine learning task; and
    a set of interactive UI elements to configure parameters that control at least one of the search inside the content or a metasearch within results of the search, wherein
      the set of interactive UI elements comprises a fourth UI element that is rendered on the display device as a graph with user-configurable nodes representing the parameters and the input data,
      the user-configurable nodes are connected via a plurality of edges, each of user-configurable nodes is of an adjustable size which indicates an importance of the respective node, each edge of the plurality of edges is of an adjustable length which depicts a confidence score between two connecting nodes of the user-configurable nodes, and a connection of at least two nodes of the user-configurable nodes indicates a co-occurrence factor to be used in the search;

receiving a user input via the UI elements of the application interface, wherein the user input includes a selection of the AI model from a list of different AI models in the third UI element;

transmitting a search request to a search engine system, based on the user input;

receiving a search result corresponding to the search request from the search engine system, wherein the search result identifies, from within the content or associated metadata, at least one content element that match the input data and satisfy the parameters included in the user input; and controlling the display device to render the search result onto a result UI of the application interface.

13. The method according to claim 12, further comprising:

receiving an input via the application interface; and determining the parameters available for the search or the metasearch, based on at least one keyword included in the received input.

14. The method according to claim 12, further comprising executing, by using the AI model, the search inside the content of each media item of the set of media items to generate an initial search result, wherein the search is executed based on the input data and is the machine learning task to look-up, within the content and the associated metadata, a set of content elements that match the input data.

15. The method according to claim 14, further comprising executing a metasearch to filter the set of content elements in the initial search result, wherein the set of content elements is filtered based on the parameters in the user input, to determine the at least one content element of the search result.

16. A non-transitory computer-readable medium having stored thereon computer-implemented instructions that, when executed by an electronic device, causes the electronic device to execute operations, the operations comprising:

controlling a display device to render an application interface that comprises User Interface (UI) elements, wherein the UI elements comprise:

a first UI element to select a set of media items, a second UI element to select input data to be used for a search inside content of each media item of the set of media items;

a third UI element for selection of an Artificial Intelligence (AI) model that is suitable for a machine learning task; and a set of interactive UI elements to configure parameters that control at least one of the search inside the content or a metasearch within results of the search, wherein the set of interactive UI elements comprises a fourth UI element that is rendered on the display device as a graph with user-configurable nodes representing the parameters and the input data, the user-configurable nodes are connected via a plurality of edges, each of user-configurable nodes is of an adjustable size which indicates an importance of the respective node, each edge of the plurality of edges is of an adjustable length which depicts a confidence score between two connecting nodes of the user-configurable nodes, and a connection of at least two nodes of the user-configurable nodes indicates a co-occurrence factor to be used in the search;

receiving a user input via the UI elements of the application interface, wherein the user input includes a selection of the AI model from a list of different AI models in the third UI element;

transmitting a search request to a search engine system, based on the user input;

receiving a search result corresponding to the search request from the search engine system, wherein the search result identifies, from within the content or associated metadata, at least one content element that match the input data and satisfy the parameters included in the user input; and controlling the display device to render the search result onto a result UI of the application interface.

\* \* \* \* \*